UNITED STATES PATENT OFFICE.

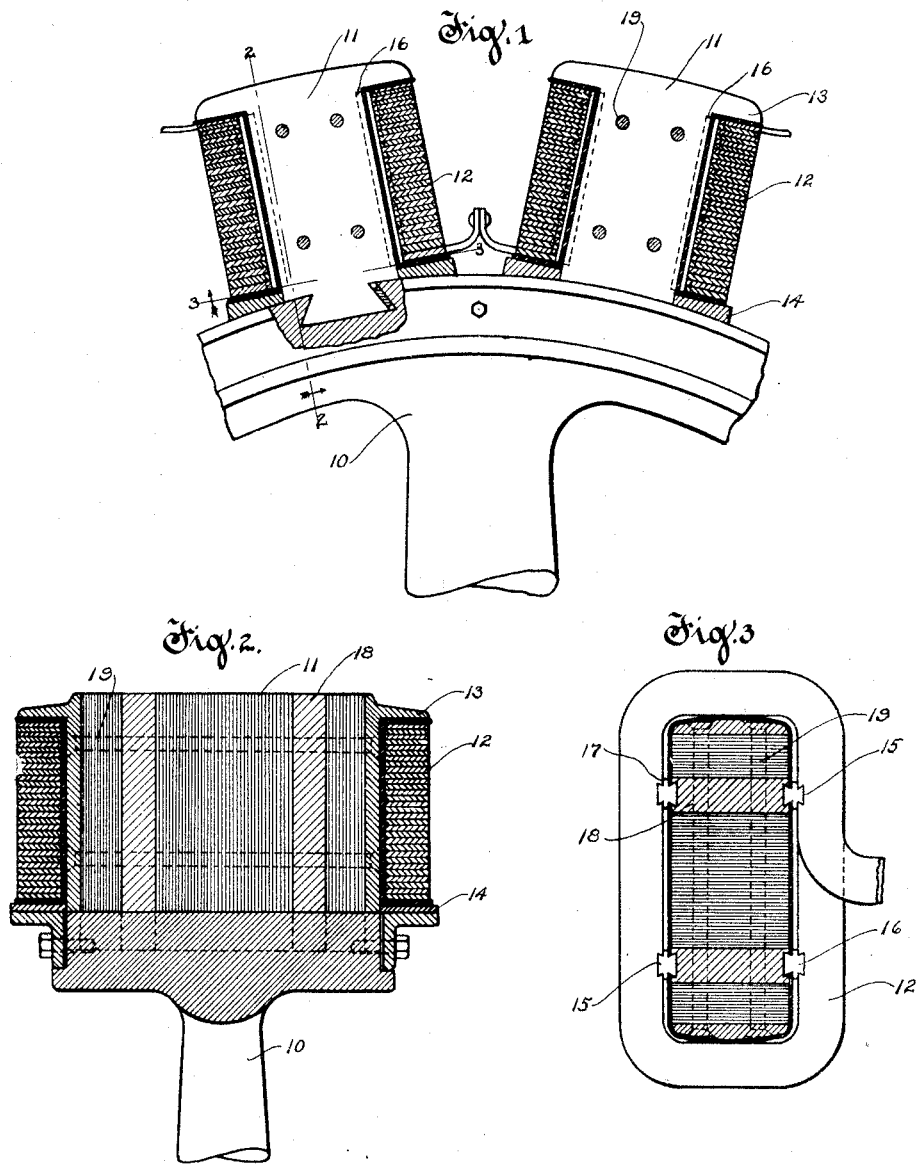

FRASER JEFFREY, OF MILWAUKEE, WISCONSIN, ASSIGNOR TO ALLIS-CHALMERS COMPANY, A CORPORATION OF NEW JERSEY.

DYNAMO-ELECTRIC MACHINE.

1,012,257.  Specification of Letters Patent.  Patented Dec. 19, 1911.

Application filed February 14, 1910. Serial No. 543,864.

*To all whom it may concern:*

Be it known that I, FRASER JEFFREY, a subject of the King of England, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines, and particularly to alternating current machines of the type in which a rotating field is used. It is especially useful for high speed machines.

Usually in rotating field machines, the pole tips or shoes of the field poles are relied on to keep the field coils in place and to overcome centrifugal force acting on the coils. But because of a component of centrifugal force normal to the axis of each field pole, the portions of the coils which are parallel to the shaft have a tendency to bulge out from the field poles, especially when the rotor is running at a high rate of speed.

The object of my invention is to provide a simple construction which will effectively and fully counteract all effects of centrifugal force on the field windings of projecting pole rotating field machines, and particularly to prevent such windings from bulging.

My invention contemplates the use of wedging or retaining members located between the field poles and the coils wound thereon, the action of the wedging members being to prevent the coils from bulging outwardly. It will be seen that with this construction centrifugal force will have practically no effect in causing the coils to bulge outwardly from the poles, but will cause the coils to be held so firmly in place that displacement is practically impossible.

The invention may be briefly summarized as consisting in certain novel details of construction and combination and arrangement of parts which will be described in the specification and set forth in the appended claims.

In the accompanying sheet of drawings, Figure 1 is a side elevation of a portion of the rotary field member provided with my coil clamping or supporting means, constructed in accordance with my invention, parts being in section; Fig. 2 is a sectional view taken substantially along the line 2—2 of Fig. 1; and, Fig. 3 is a view of a field pole provided with a winding and showing the relative positions of my clamping or retaining members, the view being taken along the line 3—3 of Fig. 1.

In the accompanying sheet of drawings I have shown a rotary field frame 10, which may be of any suitable construction, and which is provided with a plurality of outwardly projecting field magnet secured to the field frame in any suitable manner, such as by dove-tail projections, said field magnets including radial field poles 11 and field coils 12, which, in this case, are formed of edgewise wound strip copper and are held against radial movement by overhanging pole tips 13 at the outer ends of the poles, and by collars or coil seats 14 at the bases of the poles. The coils of the field member are formed in the usual way by means of coil forming machines after which they are provided with a plurality of slotted or grooved portions 15 as indicated in Fig. 3 of the drawings. Burred edges, if there be any after slotting, may be readily removed in any suitable manner after which insulation is placed between adjacent turns of the field coil. The field poles are provided with corresponding slots or grooves directly opposite the slots formed in the field coils. The slots in the field poles are located in plates 18 which are thick in comparison to the thickness of the laminæ. The laminæ and plates are held together securely by bolts 19 which pass therethrough. After the field coils are placed on the poles and insulated therefrom in some suitable manner, retaining or wedging members 16 are driven in these slotted or grooved portions of the poles and coils, each wedge having portions which engage the slots or grooves in both the field pole and coil. It is seen that these wedges draw the coils toward the field poles and retain them rigidly at a predetermined distance therefrom by means of lipped portions 17 of the wedges. In this way ventilating and insulating spaces are formed. Any number of these wedges may be used, but in this particular case I have shown four; two being on each side interposed between the field coils and the poles. These wedges, which engage each individual turn of the coil, are preferably made of some hard and strong insulating material, such as hard fiber or horn fiber.

I do not intend to limit myself to the use of insulating wedges for metal wedges can be used equally as well as insulating wedges provided they are insulated from the field poles and coils.

Thus it will be seen that when the machine is in operation the coil clamping portions cannot become loosened by the action of centrifugal force, and release the coils, as is the case with a number of coil supporting devices which are employed at the present time. The result of this construction is that I have provided coil clamping or retaining devices which are extremely effective under all conditions of rotation and can be relied upon even at the highest speed to which the machines are subjected.

In the claims it is my intention to cover all modifications of my invention which do not involve a departure from the spirit and scope of the same.

What I claim as new is:

1. In the rotating member of a dynamo-electric machine, the combination of projecting field poles, coils thereon, and wedging means located between said coils and poles for preventing bulging of said coils.

2. In the rotary member of a dynamo-electric machine, the combination of field poles provided with slots or grooves, coils mounted thereon and provided with corresponding slots or grooves, and means located in said slots and grooves for preventing bulging of said coils.

3. In the rotating member of a dynamo-electric machine, the combination of field poles provided with a plurality of slots or grooves, field coils mounted thereon and insulated therefrom and provided with corresponding slots or grooves, and wedges common to said poles and coils located in said slots or grooves for retaining said coils in normal position.

4. In the rotating member of a dynamo-electric machine, the combination of a projecting field pole provided with slots or grooves, a coil mounted thereon and provided with corresponding slots or grooves, wedges having a plurality of projections engaging said slots or grooves for retaining said coils and holding said pole and coil a predetermined distance apart.

5. In the rotating member of a dynamo-electric machine, the combination of a projecting field pole, a coil mounted thereon and insulated therefrom, and mutual wedging means for said pole and coil, said means being located between said pole and coil.

6. In the rotary member of a dynamo-electric machine, the combination of a field pole provided with a slot or groove, a coil mounted thereon and provided with a corresponding slot or groove, and an insulating wedge located between said pole and coil occupying said slots or grooves for preventing bulging of said coil and holding said pole and coil a predetermined distance apart to form a ventilating space.

7. In the rotating member of a dynamo-electric machine, the combination of projecting field poles, edgewise wound coils thereon, and wedging means located between each of said coils and poles for preventing bulging of said coils.

8. In the rotating member of a dynamo-electric machine, the combination of projecting field poles, edgewise wound coils thereon, and means located between said coils and poles engaging each individudal turn of said coil to prevent bulging.

9. In the rotating member of a dynamo-electric machine, the combination of a projecting field pole, a coil mounted thereon, and means located between said coil and pole engaging each individual turn of said coil to prevent its bulging.

Milwaukee, Wis., Jan. 31, 1910.

In testimony whereof I affix my signature, in the presence of two witnesses.

FRASER JEFFREY.

Witnesses:
CHAS. L. BYRON,
ROB. E. STOLL.